United States Patent [19]

O'Keefe et al.

[11] Patent Number: 5,381,464
[45] Date of Patent: Jan. 10, 1995

[54] SERVING CELLULAR CALLS TO STATIONS AT THE BOUNDARY BETWEEN SWITCH SERVING AREAS

[75] Inventors: Julia A. O'Keefe; Douglas H. Riley; Kenneth W. Shelhamer, all of Naperville, Ill.

[73] Assignee: AT&T Corp., Murray Hill, N.J.

[21] Appl. No.: 82,138

[22] Filed: Jun. 24, 1993

[51] Int. Cl.⁶ .......................................... H04M 11/00
[52] U.S. Cl. ...................................... 379/59; 379/58; 455/33.1
[58] Field of Search ....................... 379/57, 58, 59, 60; 455/33.1, 33.2, 33.4, 56.1

[56] References Cited

U.S. PATENT DOCUMENTS

| | | | |
|---|---|---|---|
| 4,775,998 | 10/1988 | Felix et al. | 379/59 |
| 5,047,762 | 10/1991 | Bruckert | 455/33.4 |
| 5,153,902 | 10/1992 | Buhl et al. | 379/60 |
| 5,175,758 | 12/1992 | Levanto et al. | 379/57 |

OTHER PUBLICATIONS

F. Sawyer et al., "Contribution For Resolution Of Border Issues", (EIA/TIA TR45.2 Working Group II) Orlando, Fla., pp. 1-8, pp. 1-4 drawing.
C. Blum et al., "Listen Only Paging to Resolve Border Cell Problem with Unsolicited Page Response", (Telecommunications Industry Association TR-45.2 Subcommittee, Working Group I), Downers Grove, Ill., May 3-7, 1993.

Primary Examiner—Curtis Kuntz
Assistant Examiner—I. S. Rana
Attorney, Agent, or Firm—Werner Ulrich

[57] ABSTRACT

A method of establishing a telecommunications call connection in a cellular wireless system. If a mobile station is near the border between areas served by two mobile switching center (MSCs) then the mobile is paged from appropriate base stations of one of the MSCs while the other MSC is alerted to listen for page responses from the paged mobile station. Advantageously, the number of paging orders is substantially reduced thus increasing the call handling capacity of the base station systems. The second MSC is initialized to be prepared to process a page response from the mobile station being paged from the base stations of the first MSC. Advantageously, this permits straightforward recognition of a valid paging response and a record of the call with which that response is associated.

8 Claims, 2 Drawing Sheets

SERVING CELLULAR CALLS TO STATIONS AT THE BOUNDARY BETWEEN SWITCH SERVING AREAS

TECHNICAL FIELD

This invention relates to the establishment of telecommunications calls in cellular systems.

PROBLEM

A cellular wireless system is one in which calls are established to mobile stations via a mobile switching center and a plurality of base stations each base station covering a base station serving area.

According to the present U.S. standards, when a mobile station goes into the idle state, it scans the control channels to determine the control channel with the strongest signal and tunes to that channel for further control information. Optionally, it informs the mobile switching center (MSC) for that base station of the identity of that channel by registering its location through a registration message.

The registration can be time-based (automatically if more than n minutes have elapsed since the last registration) or geographically-based (if the new location is outside some limit compared to the registered location). The registration is used by the MSC to determine from which base station to page the mobile station. While the mobile station is powered-on idle, it receives an essentially continuous stream of messages over a control channel selected by the mobile station. Occasionally, in response to an order from a base station, or in response to an insufficient signal, the mobile station will scan other control channels to determine which is the strongest and retunes to that channel. If on retuning, the strongest channel transmits data that stimulates the mobile to register, the mobile station will register. However, this is only necessary if the new strongest channel is associated with a group of base stations different from the group of base stations of the area in which the mobile was previously registered.

When an incoming call is received, the destination mobile station is paged by sending its identification number from one of these base stations. In systems built in accordance with present U.S. standards, the paging order is usually sent from a plurality of base stations, the plurality being sufficiently diverse that one of the transmitting base stations is likely to be the base station to which the mobile station is tuned. The mobile station detects the paging order and immediately checks to see which control channel is transmitting the strongest signal. That control channel identifies the base station from which the mobile station is likely to receive the optimum radio signal for the subsequent telecommunications call. The mobile station responds to the page by transmitting its response over the reverse control channel associated with that strongest control channel.

Thus, a mobile station which has received a paging order from one base station (because it is tuned to that base station channel) will frequently retune and respond to the page over the reverse control channel of another base station. If these two base stations are served by the same mobile switching center, the problem is relatively straightforward since the mobile switching center controls both base stations. However, if the mobile responds over the reverse control channel of a base station controlled by a different MSC, the problem is much more complex, because the different MSC may have no way of tying the response to a call, and cannot validate the identity of the called station adequately.

In one prior art solution to this problem, the paging order is also sent out by base stations of a second mobile switching center. The second mobile switching center, in sending out such a paging order through its base stations, prepares itself to receive a paging response and is fully aware of the possibility that it may process the call. Its data structure under these circumstances is such that if there is a timeout in response to its page order, that it will simply idle its resources (such as memory initialized to serve the call), but if it does receive a page response it will establish a connection to the caller via the first mobile switching center. A disadvantage of this arrangement is that the number of paging orders is substantially increased and, as is well known in the art, the number of paging orders which must be transmitted is one of the limiting factors on the capacity of a base station.

A problem of the prior art therefore is that there is no efficient way of paging a mobile station which may be in an area that is served by either of two mobile switching centers.

SOLUTION

The above problem is solved in accordance with applicants' invention wherein responsive to receipt of an incoming call for a mobile station, a receiving mobile switching center (MSC) determines (usually based on the registration of the mobile station) which paging MSC (the paging MSC will frequently be the receiving MSC) should perform the paging function. The receiving or paging MSC determines whether the mobile station may be in the territory served by an alternate MSC and, if so, in an advance over the prior art, requests that alternate MSC to listen for a page response from that mobile station without sending out paging orders from its base stations. The mobile station responds on the reverse control channel corresponding to the control channel from which it receives the strongest signal. If that reverse control channel is served by a base station that is served by the alternate mobile switching center, then a connection is established between the incoming call and the alternate mobile switching center and, via the alternate mobile switching center, to the mobile station. Advantageously, by placing the alternate mobile switching center into a "listen only" mode without transmitting any paging orders, the number of paging orders is minimized.

In accordance with one specific embodiment of the invention, the connection is established via the receiving MSC. Advantageously, this avoids having to redirect the call from the public switched telephone network, i.e., from an originating or tandem switch for the call.

In accordance with one specific embodiment of the invention, the alternate MSC establishes a data structure in response to the message that it should listen for a page response. This data structure can then be released if there is a page timeout; however, if a page response is in fact received, the data structure can be used to supervise the call and to send a message to the MSC that requested the page or the receiving MSC to forward the call to the alternate MSC. Advantageously, this arrangement minimizes additional special software for processing incoming mobile calls.

DETAILED DESCRIPTION

Figure 1:
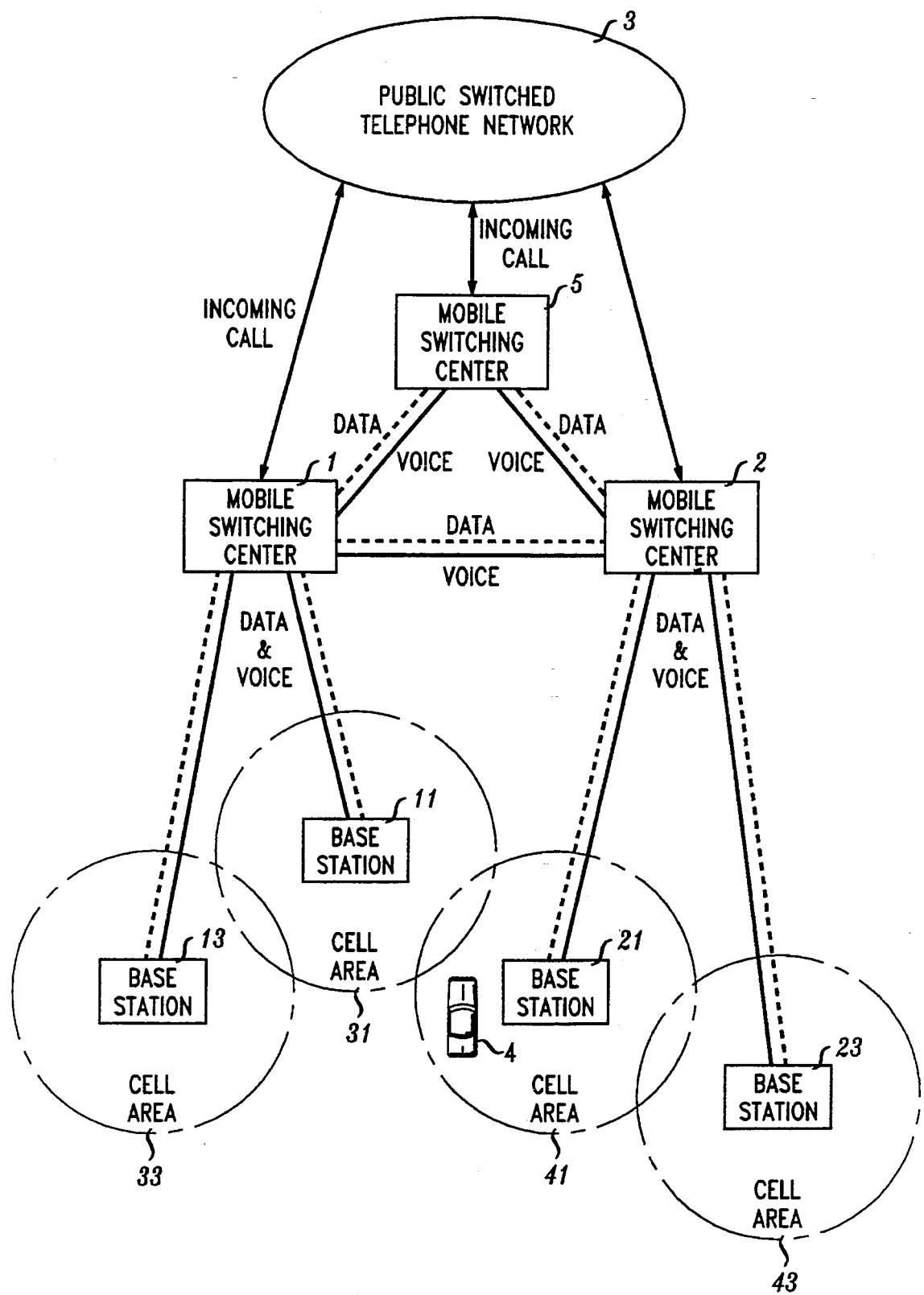
FIG. 1 is a block diagram showing the general operation of the system.

FIG. 1 is an overall block diagram of an exemplary embodiment of a system illustrating the operation of applicants' invention. Shown are two mobile switching centers (MSCs) 1 and 2 primarily involved in the method of applicant' invention. MSC 1 controls base stations 11 and 13 which serve cell areas 31 and 33, respectively. MSC 2 serves base stations 21 and 23 which serve cell areas 41 and 43, respectively. The MSCs are connected to their base stations by voice channels (for handling telecommunications calls) and a control data channel (for exchanging control information between the base station and the MSC). The two MSCs in this example are also interconnected by trunks for voice or circuit data and a data communications facility. (In case there is very little traffic between the two MSCs, or if there are regulatory or economic reasons, the voice trunk can be replaced by connection through public switched telephone network (PSTN) 3.) An incoming call to mobile station 4 is received from PSTN 3 by MSC 1 which controls the paging of that mobile station. Alternatively, the call may be received from PSTN 3 in a receiving MSC 5 which determines, based on the most recent registration of the mobile station, the identity of MSC 1, and which sends a message to MSC 1 to page mobile station 4. MSC 1 believes at this time that mobile station 4, the mobile station identified in the incoming call message received from the PSTN, is being served by this MSC and by the control channel from one of the base stations 11 or 13 because it has most recently registered via base station 11. The mobile station is usually paged from all the base stations of an area; typically, this is more than one base station. As can be seen in the diagram, mobile 4 has wandered into cell area 41 served by base station 21 served by MSC 2. Because MSC 1, or the receiving MSC 5, is aware of the fact that mobiles may move from a cell area such as cell area 31 served by MSC 1 to a cell area such as cell area 41 served by MSC 2, MSC 1, in addition to requesting base stations 11 and 13 to send out a paging order, sends a message to MSC 2 to listen for a page response from mobile station 4 without transmitting a paging order. Alternatively, MSC 5 may send an equivalent "listen only" message to MSC 2. In general, MSC 1 or MSC 5 determines that MSC 2 may receive the paging response from mobile station 4 if MSC 2 serves an area adjacent to the area in which mobile station 4 was most recently registered.

MSC 1 then sends a request to base stations 11 and 13 to page mobile station 4. Mobile station 4 which is tuned to the control channel from base station 11 receives the paging order and immediately scans to check for the strongest control channel. Mobile station 4 discovers that the strongest control channel is that emanating from base station 21 and transmits its paging response over the reverse control channel for base station 21. Base station 21 transmits the page response to MSC 2 which has been primed to listen for such a page response. MSC 2 notifies MSC 1 (or the receiving MSC 5) that it has received the page response and requests MSC 1 to forward the incoming call to MSC 2 either over a direct trunk or via the public switched telephone network.

Figure 2:
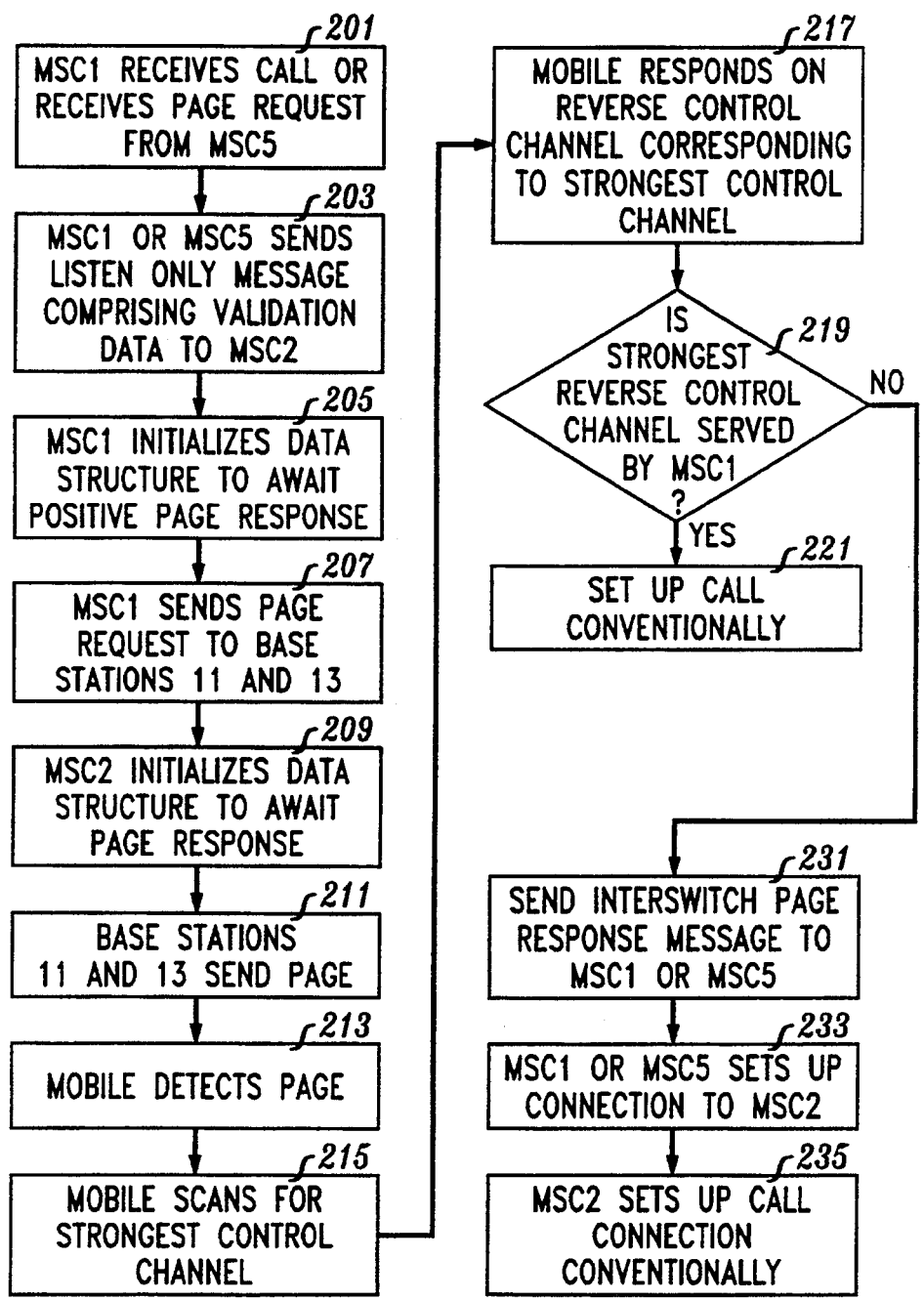
FIG. 2 is a flow diagram illustrating the operation of applicants' invention.

FIG. 2 is a flow chart of the operations for serving such an incoming call. In this illustration, MSC 1 is the mobile switching center which is identified, as the result of the most recent registration by mobile station 4, as being the MSC which should control the paging of that mobile station. MSC 1 directly receives the call, or MSC 1 receives a request to page mobile station 4 from MSC 5 which has received the call (action block 201). MSC 1 or MSC 5 send a "listen only" message to MSC 2 (action block 203) to listen for a page response from mobile station 4 without transmitting a paging order. Such a message need only be sent if the cell in which the mobile station is currently registered is near an area served by another mobile switching center, i.e., MSC 2). MSC 1 initializes its data structure to await a positive page response from mobile station 4 (action block 205). MSC 1 then sends a page request to cell sites 11 and 13 (action block 207). Responsive to receiving the "listen only" message, MSC 2 initializes its data structure to await a positive page response from mobile station 4 (action block 209). The message contains the serial number of mobile station 4 to allow MSC 2 to validate any page response. Cell sites 11 and 13 broadcast their page message (action block 211). Mobile station 4 detects the page (action block 213). Mobile station 4 immediately scans to detect the strongest control channel (action block 215). Mobile station 4 then responds to the page order on the reverse control channel corresponding to the strongest control channel (action block 217). Test 219 represents an overall system detection of whether the strongest reverse control channel is served by MSC 1. The test is, in fact, the result of a detection of the page response in one of the base stations served by MSC 1 (positive result of test 219) or by one of the stations in MSC 2 (negative result of test 219).

If the strongest reverse control channel is served by MSC 1 then the call is set up conventionally and MSC 2 is simply left to time out in the data structure initialized to await a page response from mobile station 4. If the strongest reverse control channel is served by MSC 2 then MSC 2 sends an interswitch page response message to MSC 1 or MSC 5 (action block 231), which will stop a timeout process in MSC 1. MSC 1 or MSC 5 then sets up a connection from the incoming call received from the public switched telephone network 3 to MSC 2 via either a direct trunk or via another path through the public switched telephone network 3 (action block 233). MSC 2 receives the incoming call from MSC 1 or MSC 5 and sets up the call connection conventionally (action block 235), via a direct trunk to MSC 1 or MSC 5 or via PSTN 3.

It is to be understood that the above description is only of one preferred embodiment of the invention. Numerous other arrangements may be devised by one skilled in the art without departing from the scope of the invention. The invention is thus limited only as defined in the accompanying claims.

We claim:

1. A method of establishing an incoming cellular wireless telecommunications call to a mobile station, said method comprising the steps of:

receiving a request, to page said mobile station, in a first mobile switching center (MSC);

responsive to receiving said request, determining in said first MSC that said call can be served by one of a plurality of base stations controlled by said first MSC or by a base station controlled by a second MSC;

responsive to said determination, sending a request from said first MSC to said second MSC to listen for a page response from said mobile station, but without transmitting a paging order from any base station controlled by said second MSC;

transmitting a paging order to said mobile station from at least one base station controlled by said first MSC;

responsive to receiving said paging order in said mobile station, transmitting a page response from said mobile station over a reverse control channel to a base station selected by said mobile station, the selected base station controlled by said first MSC or controlled by said second MSC, the selected base station transmitting a strongest signal to said mobile station;

if said selected base station receiving said page response is controlled by said first MSC, establishing a connection of said incoming call from said first MSC via a base station controlled by said first MSC;

if said selected base station receiving said page response is controlled by said second MSC, transmitting a request from said second MSC to said first MSC for establishing a connection of said incoming call via said second MSC and a base station controlled by said second MSC to said mobile station.

2. The method of claim 1 wherein said receiving a request to page said mobile station comprises:

receiving said incoming call in said first MSC; and responsive to receiving said incoming call, determining that said mobile is to be paged from said first MSC.

3. The method of claim 1 further comprising the steps of:

receiving said incoming call in a third MSC, wherein said third MSC is not the same MSC as said first MSC; and transmitting, from said third MSC to said first MSC, said request to page said mobile station.

4. The method of claim 3 wherein said determining is performed in said third MSC.

5. The method of claim 4 further comprising:

establishing said connection via said third MSC.

6. The method of claim 1 wherein said determining is performed in said first MSC.

7. The method of claim 1 wherein said determining comprises determining based on a most recent registration of said mobile station.

8. The method of claim 1 wherein said request to said second MSC, sent responsive to said determining, comprises data for validating a page response from said mobile station.

* * * * *